US006339763B1

(12) United States Patent
Divine et al.

(10) Patent No.: US 6,339,763 B1
(45) Date of Patent: Jan. 15, 2002

(54) SYSTEM AND METHOD FOR VISUALIZING VEHICLES WITH ACCESSORIES

(75) Inventors: Jeff Divine; Debra McCloud; Marla Young, all of Vancouver, WA (US); Nancy Goetz; Brian Moran, both of Tigard, OR (US); Jared Boone, Beaverton, OR (US)

(73) Assignee: Eyevelocity, Inc., Portland, OR (US)

( * ) Notice: Subject to any disclaimer, the term of this patent is extended or adjusted under 35 U.S.C. 154(b) by 0 days.

(21) Appl. No.: 09/369,483

(22) Filed: Aug. 5, 1999

(51) Int. Cl.[7] .............................................. G06F 17/60
(52) U.S. Cl. ......................... 705/27; 705/26; 345/634; 703/8
(58) Field of Search ................. 705/26, 27; 345/435, 345/302, 113, 634, 629; 703/8

(56) References Cited

U.S. PATENT DOCUMENTS

| | | | | |
|---|---|---|---|---|
| 4,539,585 A | * | 9/1985 | Spackova et al. | 382/100 |
| 5,398,308 A | * | 3/1995 | Kato et al. | 345/594 |
| 5,493,490 A | * | 2/1996 | Johnson | 705/26 |
| 5,680,528 A | * | 10/1997 | Korszun | 345/630 |
| 5,774,652 A |   | 6/1998 | Smith | |
| 6,041,310 A | * | 3/2000 | Green et al. | 705/27 |
| 6,083,267 A | * | 7/2000 | Motomiya et al. | 705/26 |

FOREIGN PATENT DOCUMENTS

| | | | | |
|---|---|---|---|---|
| EP | 275124 A2 | * | 7/1988 | G06F/15/40 |
| EP | 583030 A2 | * | 2/1994 | G06F/3/033 |
| EP | 669600 A2 | * | 8/1995 | G06P/11/00 |
| EP | 696004 A1 | * | 2/1996 | G06F/17/60 |
| EP | 919941 A2 | * | 6/1999 | G06F/17/50 |

OTHER PUBLICATIONS

Deitz, D., "Human Integrated Design," Mechanical Engineering, vol. 117 No. 8, pp. 92–96 (reprinted), Aug. 1995.*
Ralph Kisiel, "Customized Cars a Click Away," Tire Business, vol. 18, No. 9, p. 6 (Jul. 17, 2000).
Davis, Jim., "Newest Software is a Wizard", Tire Review, p. 30, Nov. 1997.*
Davis, Jim. "Get the Picture: New Tools Allow Sales People to Show the Wheel Customer Something Tangible", Tire Review, p. 26, Jan. 1995.*
Strom, David., "Web Wars: Which are the Most Valuable Weapons?", Datamation, v. 43, n. 4, p. 56 (5), reprinted as pp. 1–4, Apr. 1997.*
Harris, Donna. "N.J. Store Spins a Web Winner", Automotive News, p.26, reprinted as p. 1, Feb. 1999.*
Mavrigan, Mike. "Custom Wheel Software", Modern Tire Dealer, v. 78, n. 4, pp. 39 (3), reprinted as pp. 1–5, Apr. 1997.*
Drushal, David. "Computer Shopping for Custom Wheels", Modern Tire Dealer, v. 77, n. 2, pp. 32 (3), reprinted as pp. 1–3, Feb. 1996.*

* cited by examiner

Primary Examiner—Kevin J. Teska
Assistant Examiner—Jeffrey Allen Rossi
(74) Attorney, Agent, or Firm—Baker & McKenzie

(57) ABSTRACT

A visualization system for enabling a user to select a vehicle and to overlay images of various user-selected accessories onto an image of the vehicle to cause a computer to display an image of the desired combination includes a database that stores digitized images of various vehicles and accessories. The accessories can be photographed separately from the vehicle, so that it is not necessary to photograph an accessorized vehicle for each one of the potentially thousands of vehicle/accessory combinations. The database correlates accessories and colors, with prices and other data, to the relevant vehicles. An Internet user can access the database over the Internet to select a vehicle with user-defined accessories, and then a composite image of the vehicle with accessories is presented to the user. Or, a salesperson in a dealership can access a local database of vehicles/accessories to display, on a monitor in the showroom, a composite photograph of a vehicle with a buyer-defined suite of accessories, such that the buyer can visualize the desired vehicle/accessory combination even if an actual vehicle with the desired accessory suite is not on the lot.

16 Claims, 8 Drawing Sheets

COMPOSITOR PHASE - DEALERSHIP SYSTEM

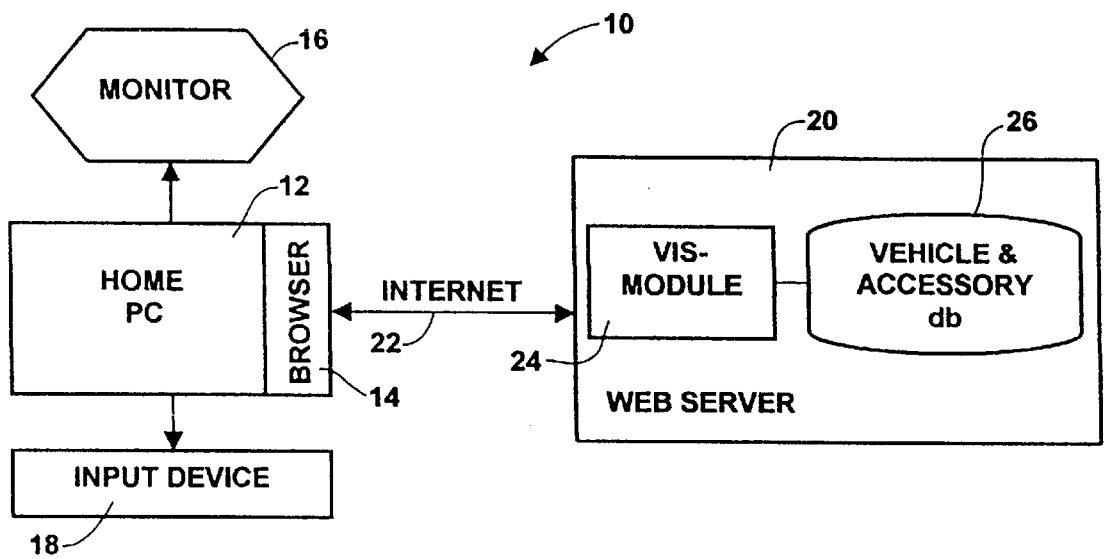
FIG. 1 - INTERNET SYSTEM
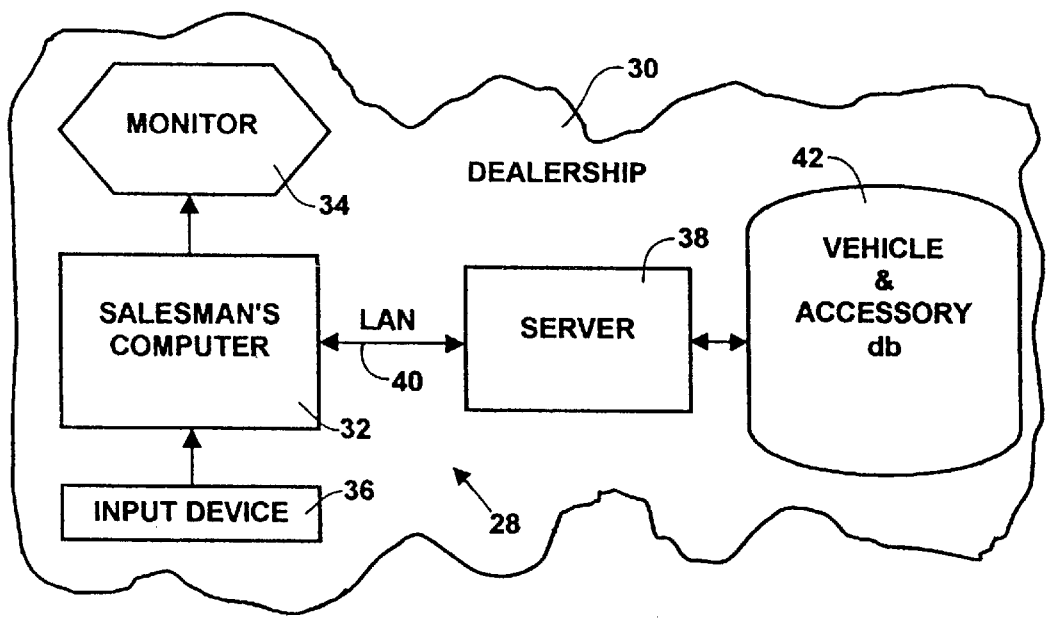
FIG. 2 - DEALERSHIP SYSTEM

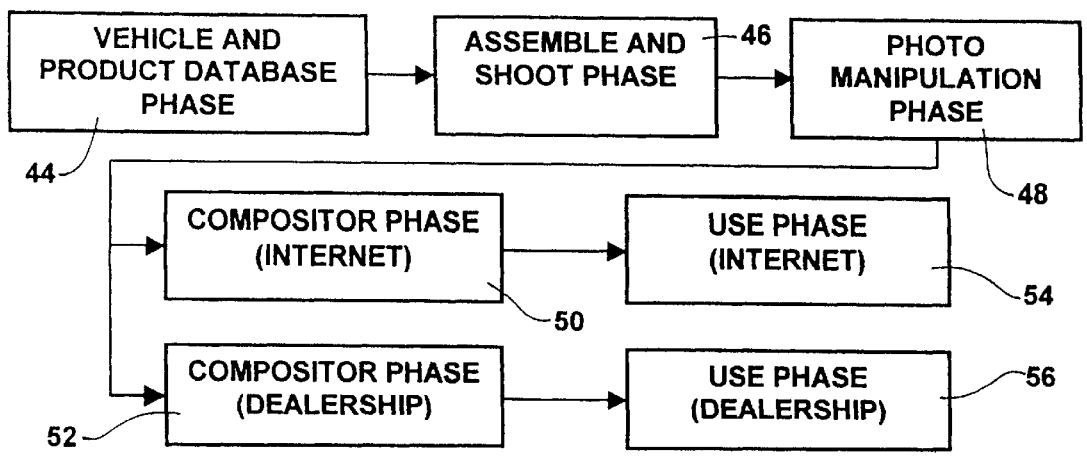
FIG. 3 - INTERACTIVE VEHICLE PROCESS OVERALL FLOW
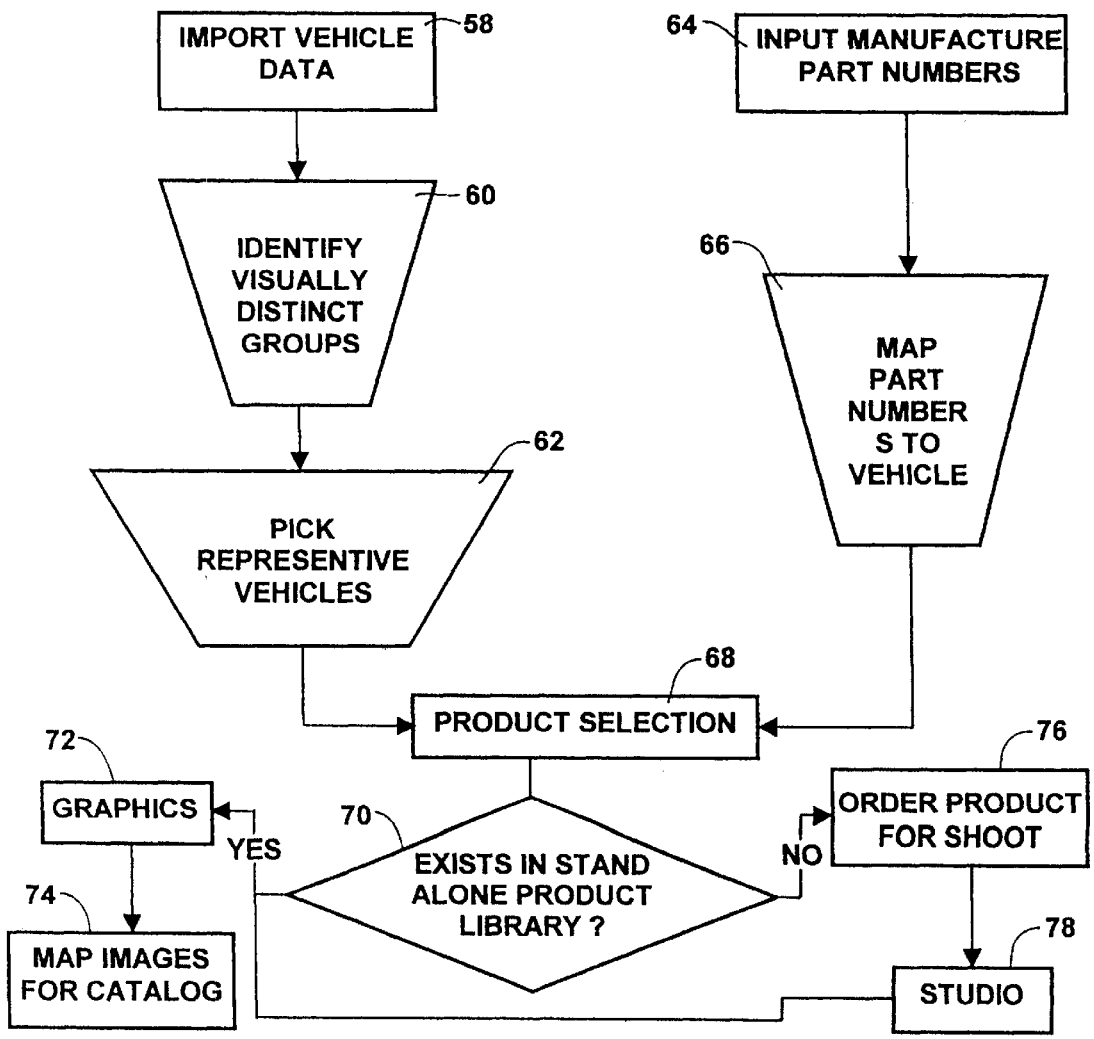
FIG. 4 - VEHICLE AND PRODUCT DATABASE PHASE

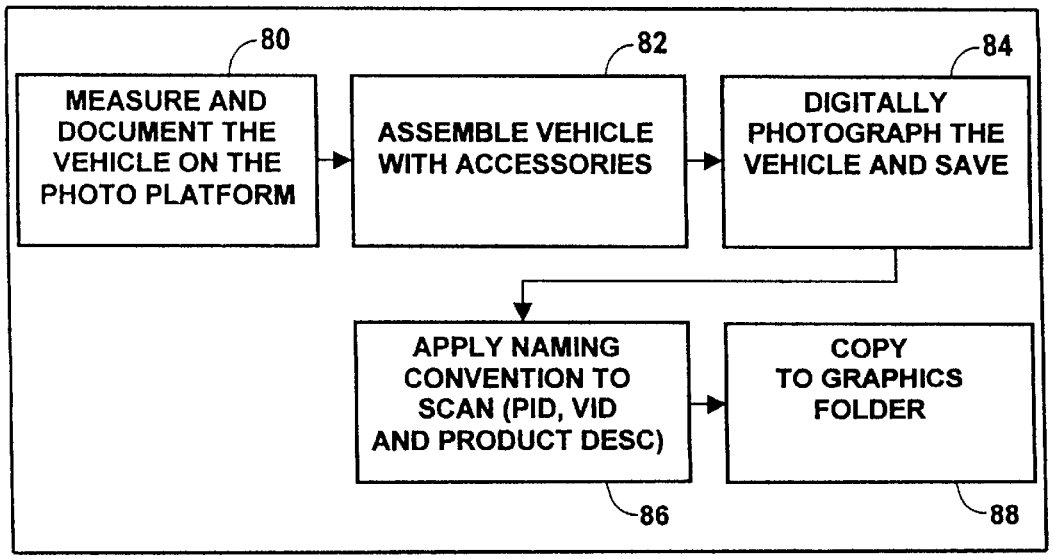
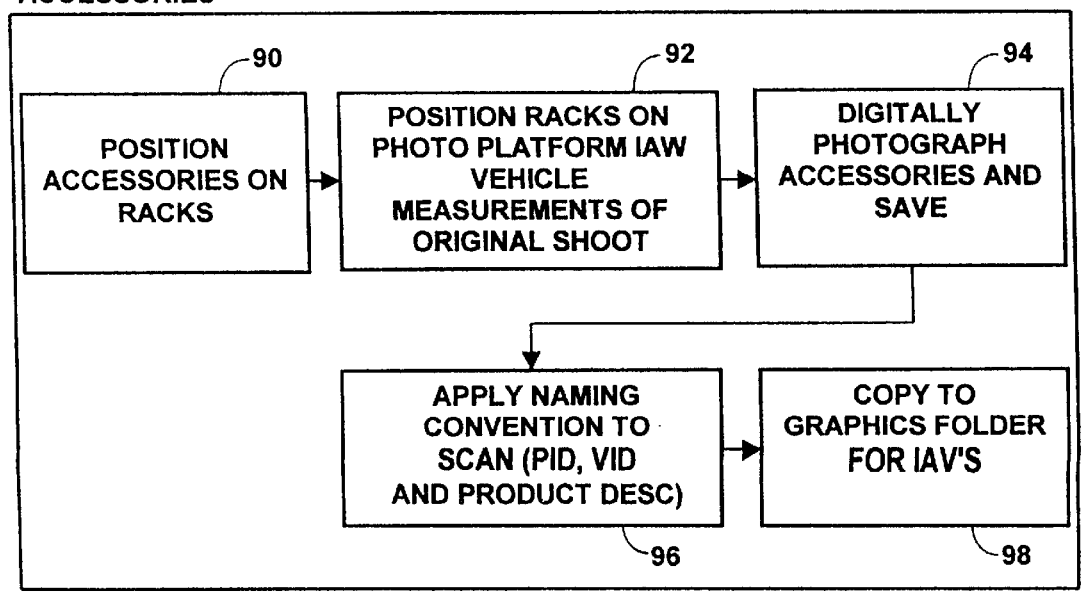
FIG. 5 - ASSEMBLE AND SHOOT PHASE

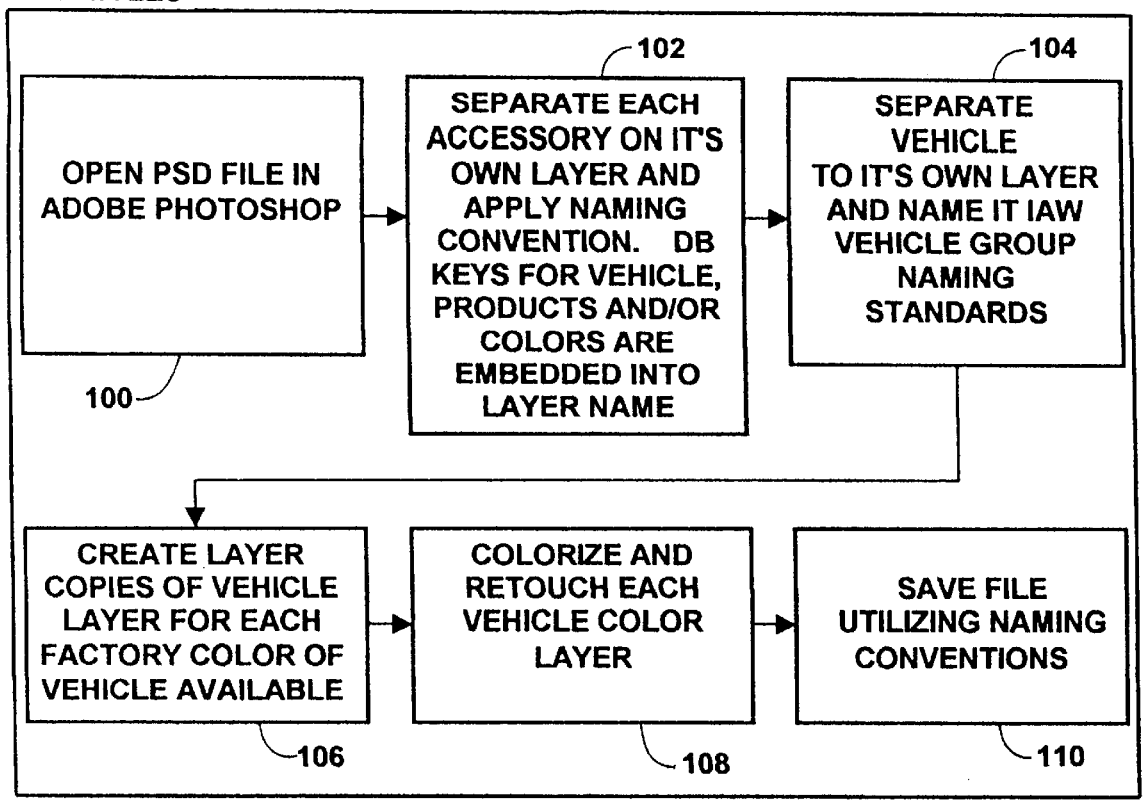
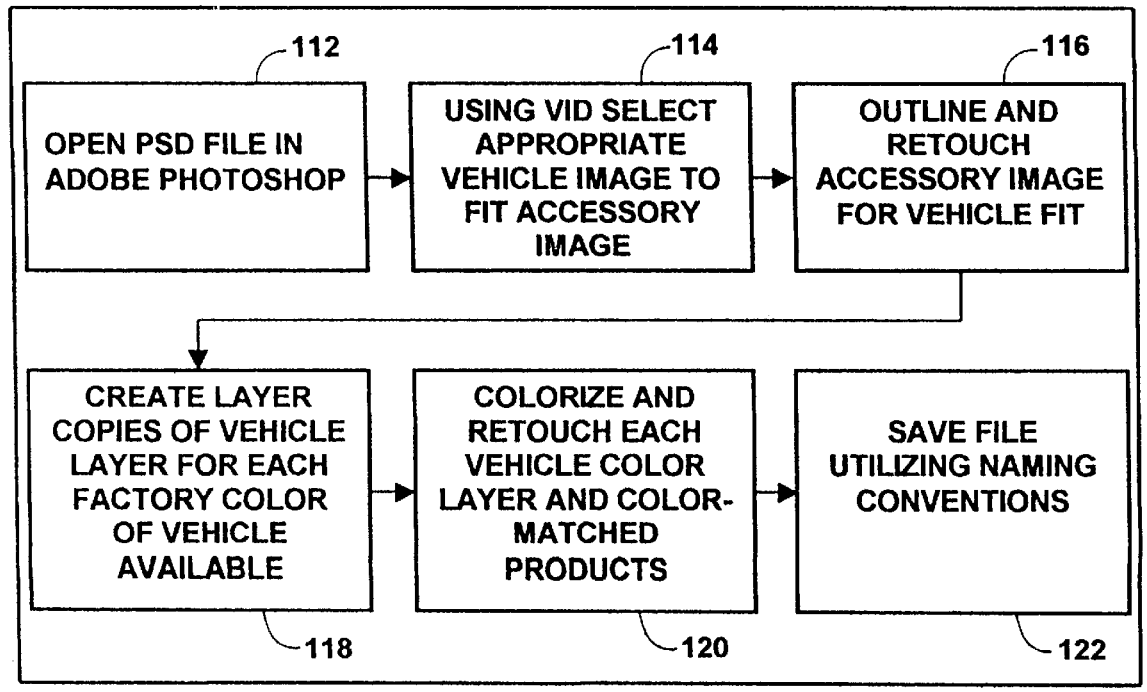
FIG. 6 - PHOTO MANIPULATION PHASE

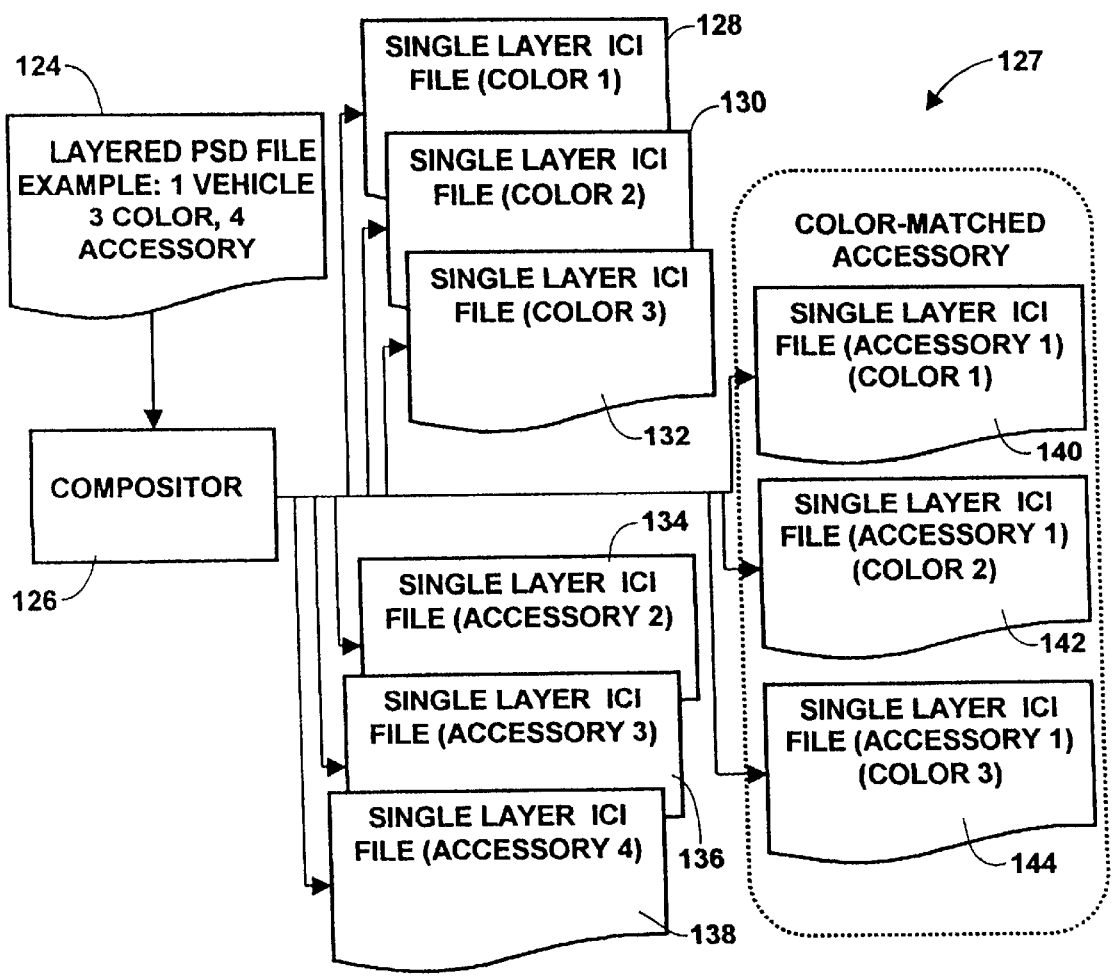
FIG. 7 - COMPOSITOR PHASE INTERNET SYSTEM
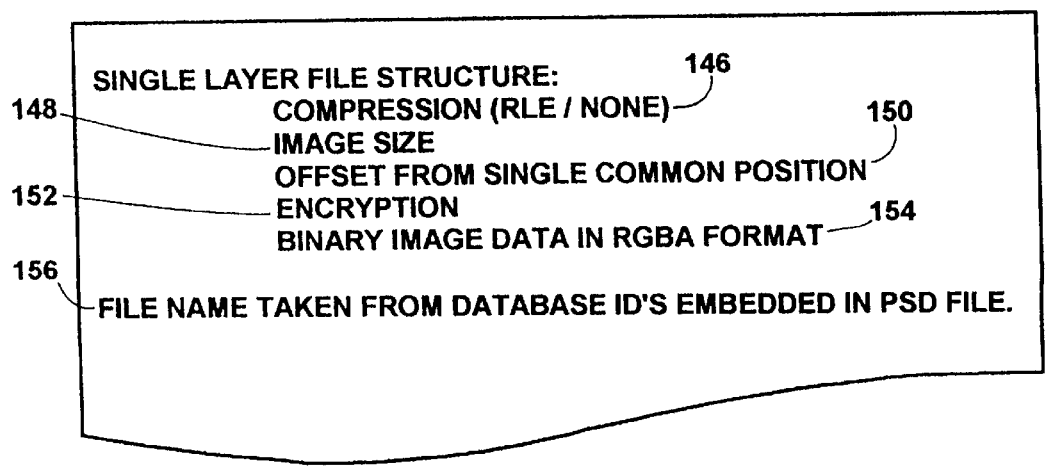
FIG. 8

FIG. 9 - COMPOSITOR PHASE - DEALERSHIP SYSTEM

PNG FILE - FILE CONTAINING OPACITY, POSITIONAL DATA AND TRANSPARENCY DATA.

JPG FILE - FILE CONTAINING RGB IMAGES INFORMATION

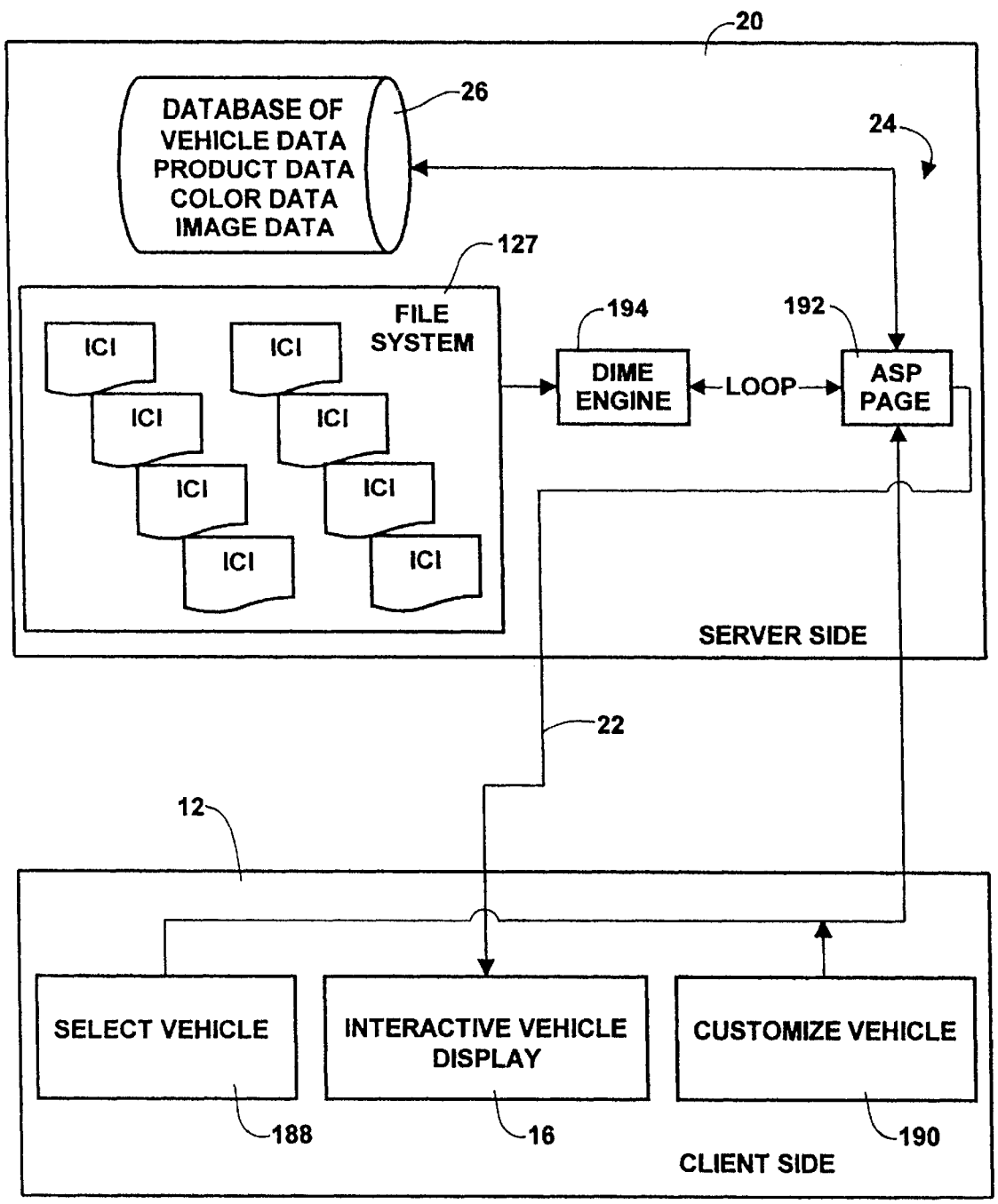
FIG. 11 - USE PHASE INTERNET SYSTEM

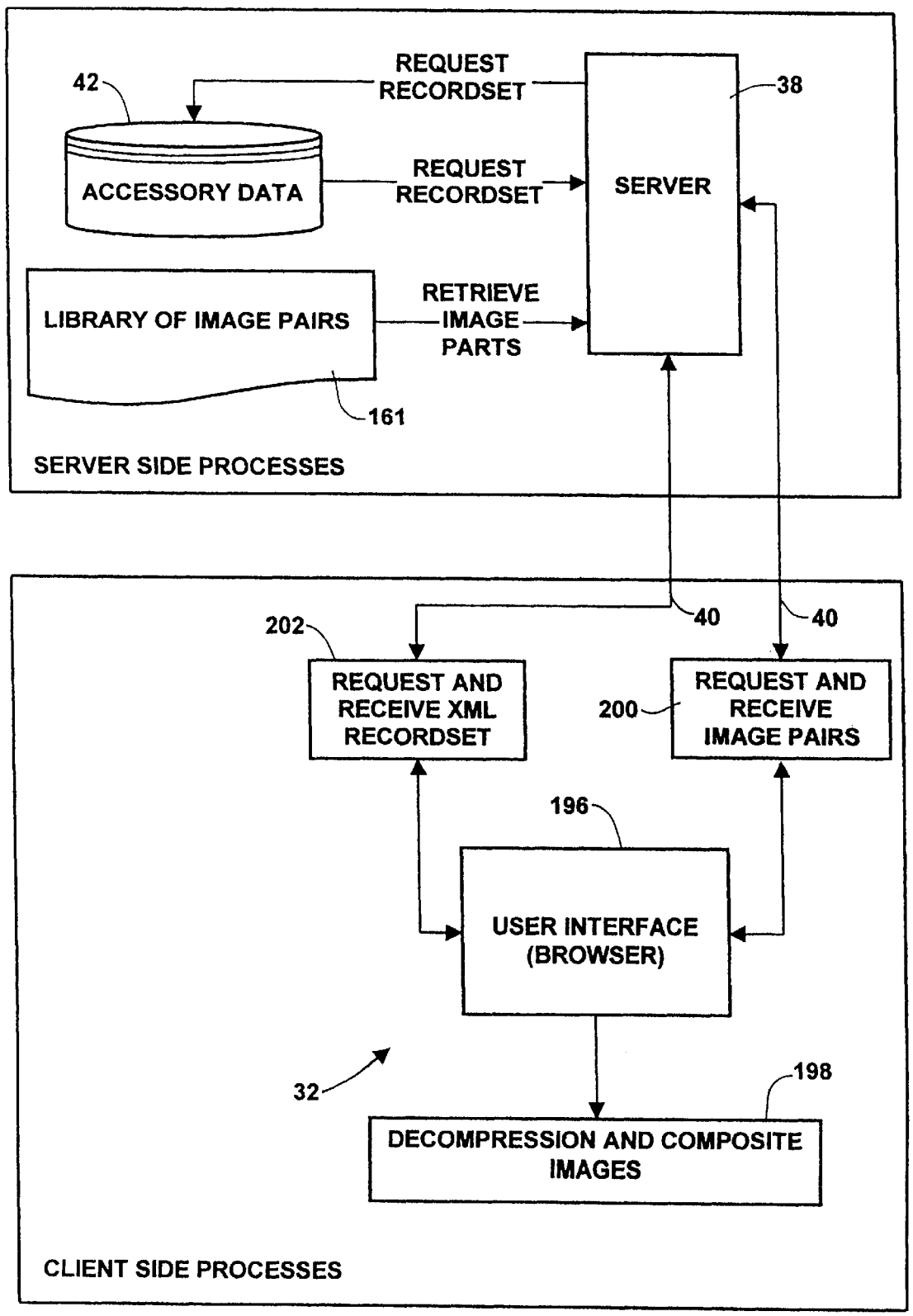
FIG. 12 - USE PHASE DEALERSHIP SYSTEM

SYSTEM AND METHOD FOR VISUALIZING VEHICLES WITH ACCESSORIES

BACKGROUND OF THE INVENTION

1. Field of the Invention

The present invention relates generally to accessorizing vehicles, and more particularly to systems and methods for visualizing, using computers, vehicles with accessories.

2. Description of the Related Art

Accessories can be added to most stock vehicles to enhance either the appearance or performance of the vehicles. Included in the term "accessories" are certain stock items. Also included in the term "accessories" are add-on parts that are made by the vehicle manufacturer, as well as add-on parts that are made by original equipment manufacturers (OEMs) and sold by car dealers.

As an example, a vehicle manufacturer might make a "sport" package available on a particular model, with the "sport" package including one or more aesthetically pleasing external components such as sport mirrors, flared fenders, and the like. Such accessories ordinarily are "added on" at the vehicle factory, although many vehicle manufacturer accessories can be bought by a consumer at a dealership. In contrast, an OEM might make floorboards for pickup trucks that can fit several vehicle models, as well as, e.g., front hood bras, and indeed a plethora of other accessories that are sold at the dealership.

In any case, a car buyer potentially has dozens, perhaps hundreds, of combinations of accessories from which to select. Unfortunately, as recognized by the present invention only a few of these combinations are likely to be embodied in a single vehicle package at any given time on a dealer showroom. Consequently, the present invention understands that a buyer must resort to imagining what a particular combination of accessories might look like. As further understood herein, it would be desirable from both a buyer's viewpoint and a dealer's viewpoint to provide a means by which a buyer can quickly visualize many combinations of accessories for many models.

As still further recognized herein, such a large number of accessories are available, and ordinarily in many buyer-selectable colors, that simply photographing sample vehicles having all the possible combinations of accessories and color schemes is impractical. Fortunately, the present invention has carefully considered the problems noted above, and has provided the solutions below to one or more of the noted problems.

SUMMARY OF THE INVENTION

The invention is a general purpose computer programmed according to the inventive steps herein to visualize a vehicle accessorized per a user's selection. The invention can also be embodied as an article of manufacture—a machine component—that is used by a digital processing apparatus and which tangibly embodies a program of instructions that are executable by the digital processing apparatus. This invention can be realized in a critical machine component that causes a digital processing apparatus to perform the inventive method steps herein. Also, the method includes flow process steps at least some of which can be undertaken by a computer.

In accordance with the present invention, the method for visualizing a vehicle includes photographing at least one vehicle to render a vehicle photograph. Also, the method includes photographing at least one accessory separately from the vehicle to render an accessory photograph, it being understood that the accessory is intended for use on the vehicle. The photographs are digitally stored and subsequently accessed such that, in response to a user-defined accessory combination, the accessory photograph can be superimposed onto the vehicle photograph on a computer display. With this invention, the accessory combination can be visualized.

In a preferred embodiment, a color from a database of colors that is associated with the vehicle can be defined. The vehicle photograph is characterized by the color. Preferably, plural digital photographs of respective accessories that are associated with the vehicle are rendered. Indeed, the number of accessories so displayed can be greater than eight.

As set forth in greater detail below, the accessory can be positioned on a rack in a position on the rack corresponding to the intended position of the accessory on a vehicle, prior to photographing the accessory. Also, one or more vehicle coordinates are correlated to respective locations on a photograph area, such that the accessory is positioned on the rack in accordance with the coordinates.

In any event, the digitally stored photographs can be made available on a wide area computer network, such that a computer communicating with the network can undertake the superimposing act. Or, the digitally stored photographs can be made available on a local area computer network of a vehicle dealer. In this embodiment, the user-defined accessory combination is defined by a potential buyer and can be communicated (orally or otherwise) to a seller, such that the seller can communicate with the local area network and present the vehicle with accessory on a computer display located at the vehicle dealer.

In another aspect, a computer-implemented method for promoting the selling of a vehicle includes receiving, from a buyer at a vehicle dealership, a user-defined accessory combination including at least one vehicle, at least one color thereof, and at least one accessory related thereto. The accessory is selected from a group of accessories numbering greater than eight. A database that is located at the vehicle dealership is accessed to retrieve digital photographs representative of the vehicle and accessory, and then the photograph of the accessory is presented on a computer display located at the vehicle dealership. A photograph of the vehicle is also presented on the computer display along with the photograph of the accessory, to promote a sale of the vehicle with accessory.

In still another aspect, a computer-implemented method is disclosed for permitting a user of a wide area computer network to visualize a vehicle having a user-defined accessory combination. The method includes storing digital photographs in a database that is accessible to the user via the wide area network. As intended by the present invention, the photographs include at least one vehicle photograph and at least one accessory photograph, both of which are associated with at least one respective vehicle identification. Furthermore, the method includes receiving the user-defined accessory combination at a computer associated with the database. In response to the user-defined accessory combination, the accessory photograph is superimposed onto the vehicle photograph such that an image of the vehicle with accessory can be presented on a monitor of the user.

In another aspect of the present invention, a computer program product is disclosed which is readable by a digital processing apparatus and which tangibly embodies a computer program. The computer program product combines a computer readable medium with program code elements that undertake the above method.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of the present invention embodied in an Internet-based system;

FIG. 2 is a schematic diagram of the present invention embodied in a dealership-based system;

FIG. 3 is a flow chart of the overall method acts;

FIG. 4 is a flow chart of the database creation phase;

FIG. 5 is a flow chart of the assembly and photography phase;

FIG. 6 is a flow chart of the photograph manipulation phase;

FIG. 7 is a flow chart of the compositor phase for the Internet-based system;

FIG. 8 is a schematic diagram of a file structure related to the compositor phase shown in FIG. 7;

FIG. 9 is a flow chart of the compositor phase for the dealership-based system;

FIG. 11 is a diagram of the use phase for the Internet-based system, showing both physical entities and logical steps undertaken in connection with the physical entities; and FIG. 12 is a diagram of the use phase for the dealership-based system, showing both physical entities and logical steps undertaken in connection with the physical entities.

DETAILED DESCRIPTION OF THE PREFERRED EMBODIMENTS

Figure 10:
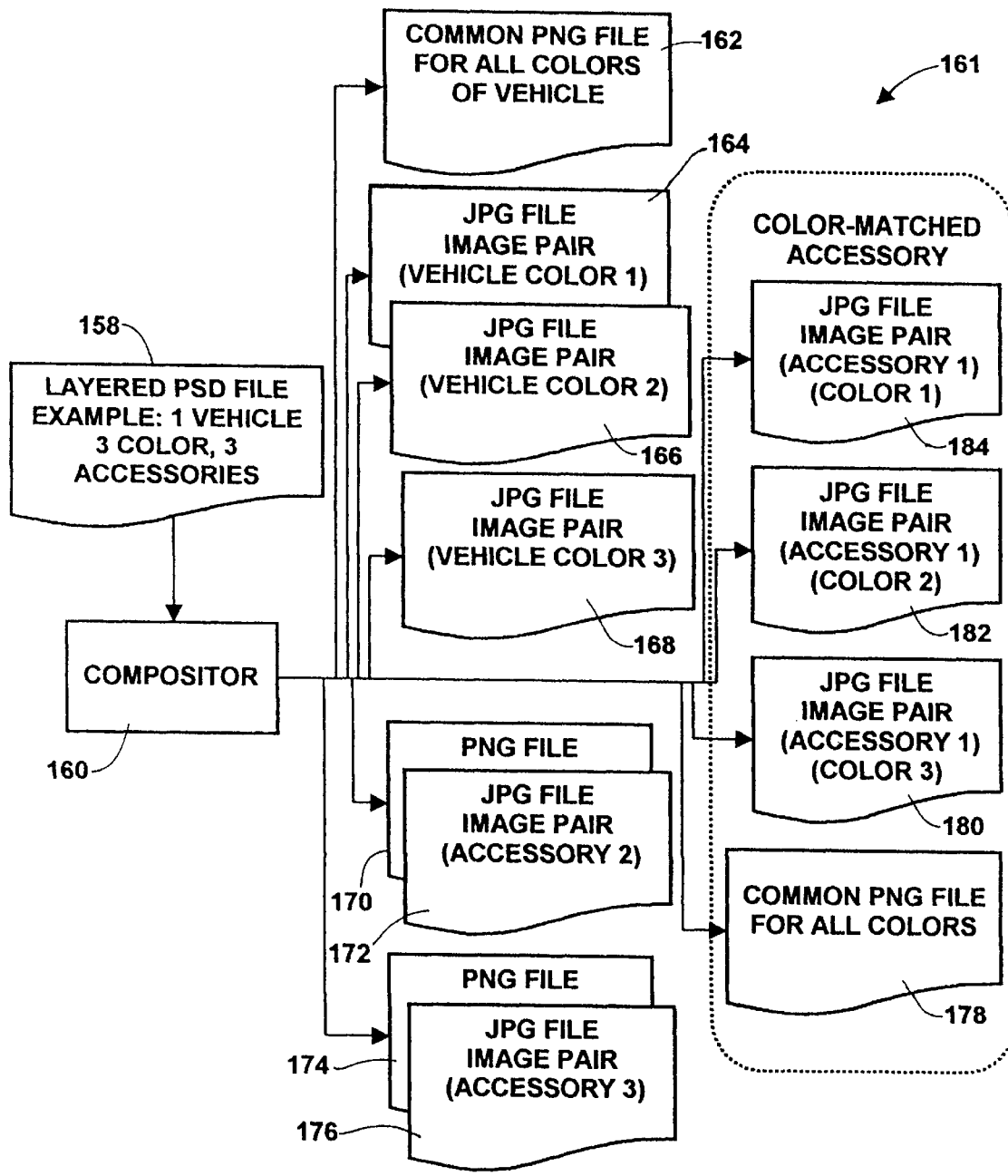
FIG. 10 is a schematic diagram of a file structure related to the compositor phase shown in FIG. 9.

Referring initially to FIG. 1, an Internet-based system for visualizing vehicles with user-defined accessory suites is shown, generally designated 10. In the particular architecture shown, the system 10 includes a digital processing apparatus, such as a user's home computer 12. In one intended embodiment, the computer 12 may be a personal computer made by International Business Machines Corporation (IBM) of Armonk, N.Y. as shown, or the computer 12 may be any computer, including a laptop or palmtop computer or indeed a mini-computer or even a mainframe.

The computer 12 includes a computer network browser 14 which, like the other software disclosed herein, may be executed by a processor within a computer (e.g., the computer 12) as a series of computer-executable instructions. These instructions may reside, for example, in RAM of the computer 12.

Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device.

FIG. 1 also shows that the system 10 can include peripheral computer equipment known in the art, including an output device such as a video monitor 16 and an input device such as a computer keyboard 18. Other output devices can be used, such as printers, other computers, and so on.

Likewise, input devices other than the keyboard 18 can be used, e.g., a mouse, or trackballs, keypads, touch screens, and voice recognition devices.

The browser 14 communicates with a Web server 20 via the Internet 22, as shown in FIG. 1, to enable a user of the computer 12 to visualize a vehicle having accessories as defined by the user, in accordance with the detailed discussion below. To this end, the Web server 20 includes a software-implemented visualization module 24 that executes certain logic set forth further below. In undertaking the logic, the module 24 accesses a vehicle and accessory database 26, preferably at the Web server 20.

Alternatively, the present vehicle visualization features can be provided in a dealership setting, as shown in FIG. 2. More particularly, a visualization system 28 can be provided on the premises of a vehicle dealership 30. The system 28 shown in FIG. 2 can include one or more salesman's computers 32 with associated monitor 34 and input device 36, with the salesman's computers 32 communicating with a server computer 38 via a local area network (LAN) 40. In undertaking the logic, the server 38 accesses a vehicle and accessory database 42, preferably located at the dealership 30 but alternatively accessible off-site via the Internet. When located at the dealership 30, the database 42 can be updated via the Internet if desired.

The flow charts below illustrate logic at least some of which is undertaken by one or more computers. Commencing with the overall process flow shown in FIG. 3, at block 44 a vehicle and product database assembly phase is undertaken, as more fully discussed below in reference to FIG. 4.

After creating the databases, the overall process flow moves to block 46 to undertake a vehicle and accessory assembly and photographic shoot phase, as discussed below in relation to FIG. 5. Then, the overall flow moves to block 48 to undertake a photographic manipulation phase, as set forth in greater detail with reference to FIG. 6.

After photographing the vehicles and accessories, the flow proceeds to block 50 to undertake a compositor phase in the case of the Internet-based system 10 shown in FIG. 1. Details of the processes at block 50 are shown in FIGS. 7 and 8. In contrast, the compositor phase is undertaken at block 52 in the case of the dealership-based system 28 shown in FIG. 2. Details of the processes at block 52 are shown in FIGS. 9 and 10. Internet-based system 10 use phase steps are then undertaken at block 54, whereas dealership-based system 28 use phase steps are undertaken at block 56. Details of the use phase of the present invention are shown in FIGS. 11 and 12.

The vehicle and product database phase is shown in FIG. 4. Commencing at block 58, vehicle data is imported from available sources. Specifically, vehicle makes, models, body styles, and colors are identified and entered into a database at block 58. Next, at step 60, visually distinct groups are identified. Stated differently, the database technician groups various vehicle models by body type, it being recognized that more than one model might share a common body type or style. Representative body styles for model groups are then selected by the technician at step 62.

In parallel with the vehicle data importation, at block 64 the manufacturer's part numbers for accessories of interest are obtained and input into the database. Then, at step 66, the part numbers are mapped or otherwise associated with the vehicle body styles with which they are intended for use. This data typically is obtained from the accessory manufacturer, not the vehicle manufacturer, and accordingly the association at step 66 represents a significant and valuable data correlation step.

Once available accessories and vehicle body styles have been input into the database, some or all of the vehicles and accessories are selected at block 68 for imaging. Proceeding to decision diamond 70, it is decided, for each vehicle and accessory selected at block 68, whether a photograph of the vehicle or accessory already exists in a photograph library that might have been previously generated. If a photograph exists, it is copied to a computer-stored graphics folder at block 72 and then listed in a database catalogue at step 74. On the other hand, if no photo exists, the process flow moves to block 76, wherein the vehicle or accessory is ordered for photographing. At block 78, the product (i.e., the vehicle or accessory) is transported to a photographic studio for photography as described further below.

FIG. 5 shows the assembly and photographic shoot phase for both vehicles and accessories. Commencing at block 80 in the case of vehicles, a vehicle to be photographed is positioned on a photographic platform and its position and orientation relative to a camera at a fixed location is measured and documented. In other words, the position of the vehicle on the platform is recorded, preferably by physically marking the platform and recording the position in a log. Thus, vehicle coordinates are correlated to corresponding locations on the platform.

Moving to block 82, the vehicle is assembled with certain accessories, if desired. As set forth further below, at block 82 only one vehicle with one suite of accessories need be provided and photographed for each body style, because additional accessories are photographed separately for subsequent composition with vehicle photographs. At block 84, the vehicle is digitally photographed. Next, at block 86 a naming convention is applied to each "scan" (i.e., to each photograph). In the preferred embodiment, the naming convention includes the identification of the accessories on the vehicle ("PID"), the vehicle identification ("VID"), and a plain text product description. The photograph with name is then copied to the graphics folder at block 88.

The photography process commences at block 90 in the case of additional accessories that can be supplied for the vehicle photographed at block 84. For each additional accessory, the accessory is positioned on a frame or rack in a position on the rack corresponding to the intended position of the accessory on a vehicle, i.e., in the same position on the rack as the accessory would otherwise occupy on the vehicle. Next, the rack is positioned on the platform at block 92 in accordance with the vehicle measurements undertaken at block 80. The position of each accessory on the rack is noted as an offset position from a reference point, e.g., the bottom left corner of the rack.

It may now be appreciated that after block 92, the accessory occupies the same volume of space it would have occupied had it been mounted on the vehicle during photography of the vehicle at block 84. Thus, with a camera at a fixed location, the photograph of the accessory bears the same perspective and scale as it would have, had it been mounted on the vehicle at block 84. In this way, a great many accessories for any given body style can be photographed separately from the vehicle or vehicles with which they are intended for use, thereby obviating the need to obtain a fully accessorized vehicle for each one of potentially hundreds of accessory suites that the vehicle can have.

The accessory or accessories on the rack are photographed at block 94, and at block 96 a naming convention is applied to each "scan" (i.e., to each photograph). In the preferred embodiment, the naming convention includes the identification of the accessories ("PID"), the identifications of the vehicle or vehicles on which the accessories can be used ("VID"), and a plain text product description. The photograph with name is then copied to the graphics folder at block 98.

FIG. 6 shows the photo manipulation phase. Commencing at block 100 in the case of vehicles, a digital file of the photograph, preferably in .psd format, is opened. Moving to block 102, each accessory that had been mounted on the vehicle during photographing is separated from the image of the vehicle and given its own digital layer with name. Embedded into the digital layers are codes representing the color of the vehicle and of the accessories. Also embedded in the layers are codes representing the PID and VID, derived from the naming conventions applied during the photography phase.

Additionally, at block 104 the vehicle body is separated from all add-on accessories that had been photographed on the vehicle, with the image of the vehicle establishing its own digital photograph layer. This layer likewise has codes embedded in it that represent the VID, PID of the accessories that pertain to the vehicle, color, and other data as required by the particular application.

Next, at block 106 for each factory color in which the vehicle is available, a copy of the vehicle image generated at block 104 is made. Likewise, for each accessory layer, a copy is made for each color in which the accessory is available. Proceeding to block 108, the layers are colorized with the respective colors and retouched as necessary. Each layer is saved using the above-described naming convention at block 110.

In the case of accessories that have been photographed on racks separately from a vehicle, commencing at block 112 a digital file of the photograph, preferably in .psd format, is opened. Moving to block 114, using the VID that accompanies the image of the accessory, a vehicle image is associated with the accessory. After obtaining the vehicle image, the process moves to block 116, wherein the image of the accessory is outlined and retouched as necessary such that the accessory better "fits" the image of the vehicle. At this point, the image of the accessory can be overlaid on the image of the vehicle as required, but a composite image of the vehicle with accessory is not yet stored.

At block 118 for each factory color in which the vehicle is available, a copy of the vehicle layer is made, if not already undertaken at block 106 above. Likewise, for each accessory layer, a copy is made for each color in which the accessory is available. Proceeding to block 120, the layers are colorized with the respective colors and retouched as necessary. Each layer is saved using the above-described naming convention at block 122.

FIGS. 7 and 8 further illustrate the principles set forth above by showing the compositor phase used by the Internet-based system 10 shown in FIG. 1. In FIG. 7, assume for illustration that a single vehicle having three body colors is associated with four accessories numbered 1–4, with accessory #1 being available in three colors and accessory nos. 2–4 being available in one color each.

State 124 represents the layered .psd file generated by the process in FIG. 6. This .psd file is sent to a software-implemented compositor 126, which creates, for each layer, an individual file having the format discussed below. Thus, the compositor 126 generates a file system, generally designated 127. In the figures, these files are designated "ICI" files. With the above example in mind, the three copies of the vehicle image layer (one for each color) are transformed into three respective vehicle image files 128, 130, 132. Similarly, the layers for the one-color accessories 2–4 are transformed into respective accessory files 134, 136, 138. Recall, however, that accessory #1 comes in three colors. Accordingly, three separate accessory #1 files 140, 142, 144, one for each color, are created by the compositor 126.

FIG. 8 shows the structure of each of the files created by the compositor 126. As shown, each file includes a compression field 146, indicating whether a data compression scheme, if any, is used. Also, each file includes a size field 148, indicating the size of the image represented by the file. Moreover, each file includes an offset position 150, indicating the offset of, e.g., a separately photographed accessory relative to the reference point on the above-discussed rack. Moreover, each file includes image data 154, preferably in RGBA format known in the art. And, each file includes a file name 156 that is derived from the VID/PID discussed above.

The present invention understands that in contrast to the relatively large computing power of a typical Web server computer, an in-dealership server computer might have only the computing power of a PC-based workstation. Accordingly, the compositor phase shown in FIGS. 9 and 10 for the in-dealership system 28 of FIG. 2 generates relatively compact files, compared to the files described above for the Internet-based system 10.

For illustration purposes, FIG. 9 assumes that a layered image file 158 of one vehicle with three colors and three accessories, two accessories having only one color and one accessory having three colors, is provided to a software-implemented compositor 160 to create a file system, generally designated 161. The compositor 160 generates at least two files for each layer. More specifically, in the case of the vehicle, the compositor 160 generates a single file 162 in .png format, containing information regarding image opacity, positional data, and transparency data, as indicated in FIG. 10. Furthermore, for each one of the three vehicle colors, the compositor 160 generates three respective image files 164, 166, 168 in, e.g., .jpg format. In accordance with .jpg format principles, the image files 164, 166, 168 contain image information in RGB (red-green-blue) format, as indicated in FIG. 10.

In contrast, for the first single-color accessory layer, the compositor 160 generates a respective .png file 170 and a .jpg-formatted image file 172. Likewise, for the second single-color accessory layer, the compositor 160 generates a respective .png file 174 and a .jpg-formatted image file 176. However, for the accessory having three color layers, the compositor 160 generates a single .png file 178 and three .jpg-formatted image files 180, 182, 184, one for each color. It is to be understood that the colors represented by the files are embedded in the names of the files.

The use of the Internet-based system 10 can be seen in cross-reference to FIGS. 1 and 11. As shown, the Web server 20 accesses the file system 127 and database 26 in response to user inputs for requested vehicles with user-determined accessories thereon. More specifically, using the input device 18 shown in FIG. 1, a user of the computer 12 can select a particular vehicle model, as indicated at 188 in FIG. 11, and the user can also specify accessories for the vehicle, as indicated at 190 in FIG. 11. The user also selects the colors for the vehicle and accessories. Thus, the user specifies an accessory combination. This information is sent via the user's browser 14 to the Web server 20. In response, the Web server 20 communicates, via the Internet 22, a composite image of the vehicle with accessories, for display on the monitor 16. It is to be appreciated that the user computer 12 is essentially a "thin client" requiring only a commercially-available browser to undertake its part of the present visualization process.

Further details of the Web server 20 are shown in FIG. 11. The user-defined vehicle and accessory selections are sent to an active server pages (ASP) engine 192 at the Web server 20. The ASP engine 192 correlates the user-selected accessories and vehicle to corresponding PIDs and VIDs, using the database 26. With this information, the ASP engine 192 accesses a digital image management engine (DIME) 194. More specifically, in the preferred embodiment the ASP engine 192 sends one selection (e.g., vehicle type, or accessory type, with color as specified by the user) at a time to the DIME 194, and the DIME 194 in response fetches the appropriate one of the ICI files in the files system 127.

After fetching one ICI file, the DIME 194 awaits instruction from the ASP engine 192 as to what file to fetch next, and the DIME 194 continues to fetch the files, one at a time, overlaying them on one another using the offset fields 150. Effectively, the DIME 194 superimposes photographs of the user-defined accessories onto a photograph of the user-defined vehicle for subsequent display of the composite image on a computer display, such that the accessory combination can be visualized.

When all files have been fetched, the ASP 192 commands the DIME 194 to output the composite image, which the ASP 192 sends back to the user computer 12 via the Internet 22 for display of the image on the monitor 22.

Now referring to FIGS. 2 and 12, the use phase of the dealership system 28 can be seen. A browser 196 of the salesman's computer 32 preferably is used as a user interface for requesting and displaying images of accessorized vehicles as indicated at state 198. A buyer at the vehicle dealership 30 can communicate to the salesman user of the computer 32 a user-defined accessory combination including a vehicle, one or more, and indeed greater than eight, accessories, with desired colors. Using the input device 36 shown in FIG. 2, the salesman-user communicates the requested composite to the server 38.

In accordance with browser principles known in the art, the request is formatted into a request for .png/.jpg file pairs, as indicated at 200 in FIG. 12. Also, the request is formatted by the browser into an XML (or HTML) recordset request, as indicated at 202 in FIG. 12. These requests are communicated via the LAN 40 to the server 38. In response, the server 38 accesses the database 42 and file system 161 to retrieve the recordsets and image pairs, respectively. The data is returned to the browser 196, with the image of the vehicle, as accessorized by the user, being displayed on the monitor 34 (FIG. 2). As indicated in FIG. 12, client interface components are delivered via cab files when the salesman's computer 32 first establishes communication with the server 38, in accordance with browser principles known in the art.

While the particular SYSTEM AND METHOD FOR VISUALIZING VEHICLES WITH ACCESSORIES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A method for visualizing a vehicle or an accessory combination, comprising the acts of:
   photographing at least one vehicle to render a vehicle photograph;
   photographing one or more accessories separately from the vehicle to render each accessory photograph, the one or more accessories each being intended for use on at least the vehicle and being positioned on a rack in a position on the rack corresponding to the intended position of the one or more accessories on the vehicle;
   digitally storing the photographs;
   accessing the digitally stored photographs; and
   in response to a user-defined accessory combination, superimposing each accessory photograph onto the vehicle photograph on a computer display.

2. The method of claim 1, further comprising the act of correlating at least one vehicle coordinate to a location on a photograph area, such that the accessory is positioned on the rack in accordance with the correlating act.

3. A computer-implemented method for promoting the selling of a vehicle or an accessory combination, comprising the acts of:
   receiving, from a buyer at a vehicle dealership, a user-defined accessory combination including at least one vehicle, at least one color thereof, and one or more accessories related thereto, the one or more accessories each being selected from a group of accessories numbering greater than eight different kinds and related to the vehicle;
   accessing a database located at the vehicle dealership to retrieve therefrom digital photographs representative of the vehicle and the one or more accessories;
   causing each photograph of the one or more accessories to be presented on a computer display located at the vehicle dealership;
   causing the photograph of the vehicle to be presented on the computer display along with each photograph of the one or more accessories, to promote a sale of the vehicle with the one or more accessories;
   photographing the vehicle to render a vehicle photograph;
   photographing at least one accessory separately from the vehicle to render an accessory photograph;
   digitally storing the photographs in the database located at the dealership;
   selecting a color from a database of colors associated with the vehicle;
   causing the vehicle photograph to be characterized by the color;
   rendering plural digital photographs of respective accessories, all being associate with the vehicle; and
   positioning the accessory on a rack in a position on the rack corresponding to the intended position of the accessory on the vehicle, prior to photographing the accessory.

4. The method of claim 3, further comprising the act of correlating at least one vehicle coordinate to a location on a photograph area, such that the accessory is positioned on the rack in accordance with the correlating act.

5. A computer-implemented method for permitting a user of a wide area computer network to visualize a vehicle having a user-defined accessory combination, comprising the acts of:
   storing digital photographs as a file in a file system or other database accessible to the user via the wide area network, the photographs including at least one vehicle photograph and one or more accessory photographs, the photographs being associated with at least one respective vehicle identification;
   layering each digital photograph file into layers, each layer corresponding to an available color of at least one vehicle or one or more accessories;
   coloring each layer corresponding to the corresponding available color of the at least one vehicle or the one or more accessories;
   saving each colored layer as at least one vehicle file or as one or more accessory files in the file system or other database;
   receiving the user-defined accessory combination at a computer associated with the database; and
   in response to the user-defined accessory combination, superimposing each accessory photograph stored in the one or more accessory files onto the vehicle photograph stored in the at least one vehicle file such that a display of the vehicle with the one or more accessories can be presented on a monitor of the user.

6. The method of claim 5, further comprising the act of selecting a color from a database of colors associated with the vehicle, and causing the vehicle photograph to be characterized by the color.

7. The method of claim 5, further comprising the act of rendering plural digital photographs of respective accessories, all being associated with the vehicle.

8. The method of claim 5, wherein the number of different kinds of accessories is greater than eight.

9. The method of claim 5, further comprising the act of positioning the accessory on a rack in a position on the rack corresponding to the intended position of the accessory on a vehicle, prior to photographing the accessory.

10. The method of claim 9, further comprising the act of correlating at least one vehicle coordinate to a location on a photograph area, such that the accessory is positioned on the rack in accordance with the correlating act.

11. A computer program device comprising:
    a computer program storage device readable by a digital processing apparatus; and
    a program means on the program storage device and including instructions executable by the digital processing apparatus for performing method acts for promoting the selling a vehicle or an accessory combination, the method acts comprising:
       receiving, from a buyer at a vehicle dealership, a user-defined accessory combination including at least one vehicle, at least one color thereof, and one or more accessories related thereto, the one or more accessories each being selected from a group of accessories numbering greater than eight different kinds and related to the vehicle;

accessing a database located at the vehicle dealership to retrieve therefrom digital photographs representative of the vehicle and the one or more accessories.

causing each photograph of the one or more accessories to be presented on a computer display located at the vehicle dealership; and causing the photograph of the vehicle to be presented on the computer display along with each photograph of the one or more accessories, wherein the method acts further comprise positioning the accessory on a rack in a position on the rack corresponding to the intended position of the accessory on the vehicle, prior to photographing the accessory.

12. The computer program product of claim 11, wherein the method acts further comprise correlating at least one vehicle coordinate to a location on a photograph area, such that the accessory is positioned on the rack in accordance with the correlating act.

13. A computer program device comprising:

a computer program storage device readable by a digital processing apparatus; and a program means on the program storage device and including instructions executable by the digital processing apparatus for performing method acts for permitting a user of a wide area computer network to visualize a vehicle having a user-defined accessory combination, the method acts comprising:

storing digital photographs as a file in a file system or other database accessible to the user via the wide area network, the photographs including at least one vehicle photograph and one or more accessory photographs, the photographs being associated with at least one respective vehicle identification;

layering each digital photograph file into layers, each layer corresponding to an available color of at least one vehicle or one or more accessories;

coloring each layer corresponding to the corresponding available color of the at least one vehicle or the one or more accessories;

saving each colored layer as at least one vehicle file or as one or more accessory files in the file system or other database;

receiving the user-defined accessory combination at a computer associated with the database; and in response to the user-defined accessory combination, superimposing each accessory photograph stored in the one or more accessory files onto the vehicle photograph stored in the at least one vehicle file such that a display of the vehicle with the one or more accessories can be presented on a monitor of the user.

14. The computer product of claim 13, wherein the method acts further comprise rendering plural digital photographs of respective accessories, all being associated with the vehicle, wherein the number of different kinds of accessories is greater than eight.

15. The computer program product of claim 13, wherein the method acts further comprise:

positioning the accessory on a rack in a position on the rack corresponding to the intended position of the accessory on a vehicle, prior to photographing the accessory; and correlating at least one vehicle coordinate to a location on a photograph area, such that the accessory is positioned on the rack in accordance with the correlating act.

16. The computer program product of claim 13, in combination with a computer system.

* * * * *